R. H. IRVINE.
TREE SAWING MACHINE.
APPLICATION FILED JUNE 30, 1917.
1,345,492.
Patented July 6, 1920.
2 SHEETS—SHEET 1.
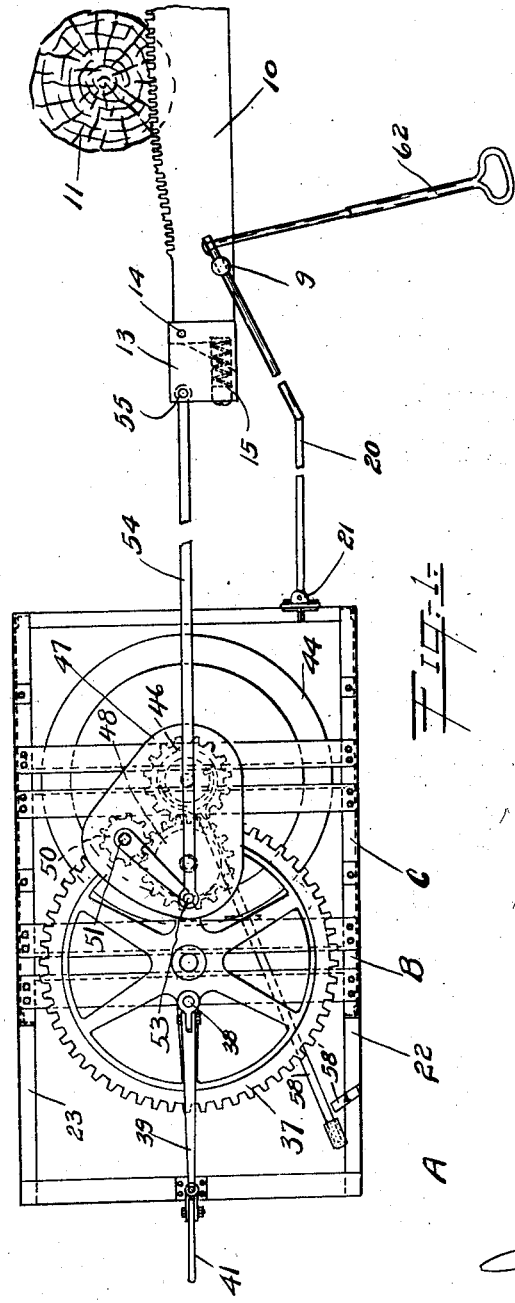
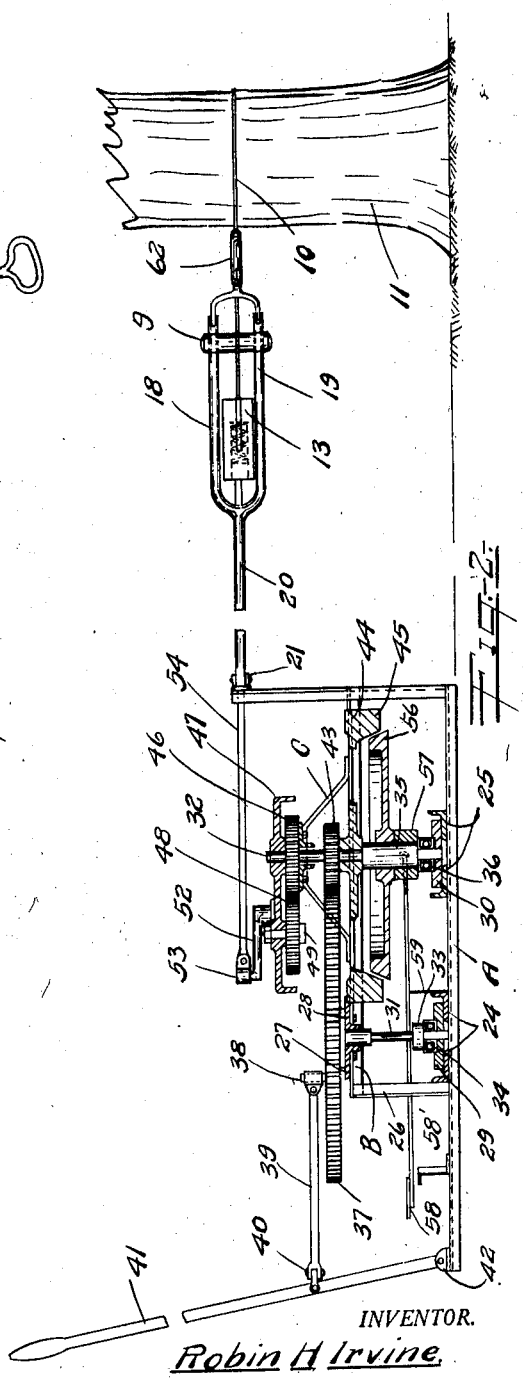
INVENTOR.
Robin H Irvine,
BY Edward R Monroe
ATTORNEY

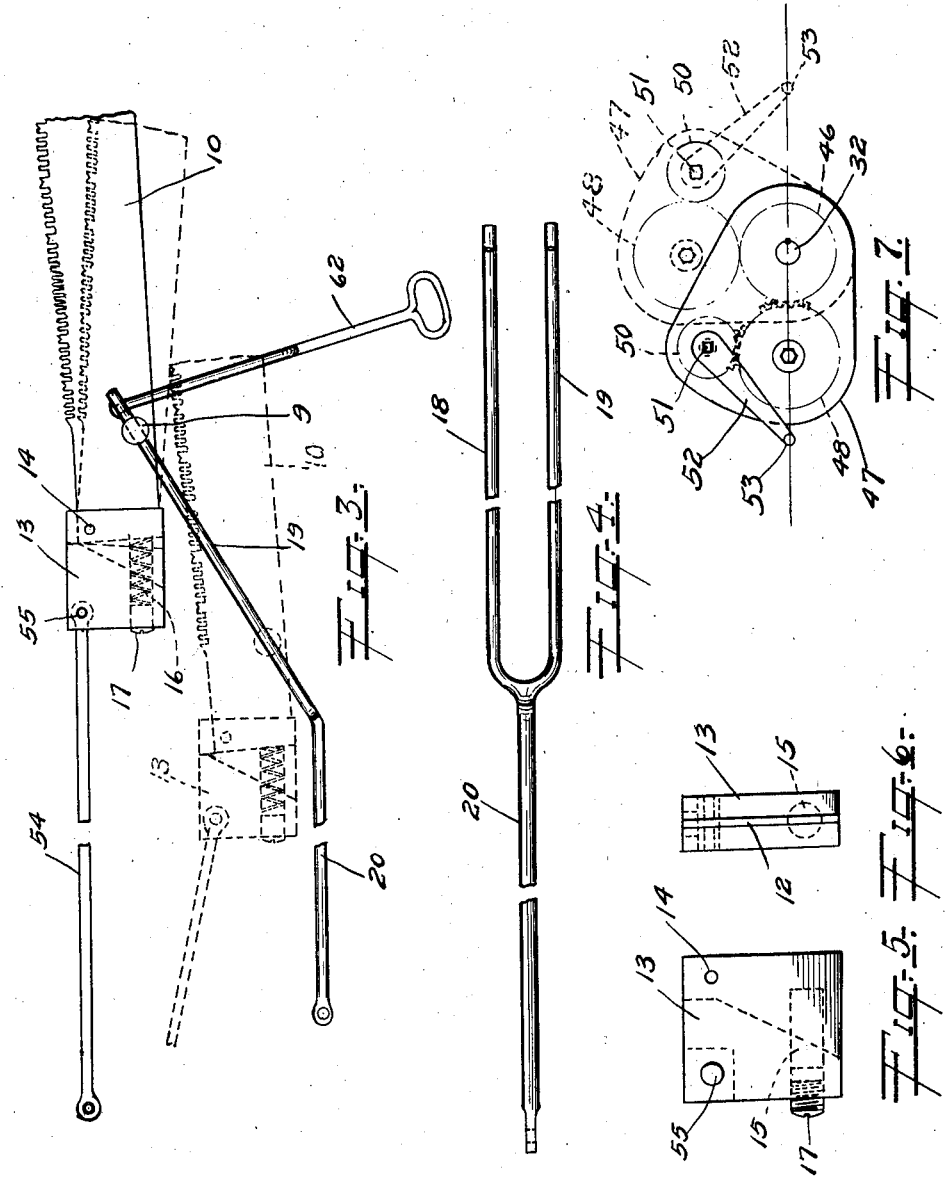

UNITED STATES PATENT OFFICE.

ROBIN H. IRVINE, OF BAY CITY, MICHIGAN.

TREE-SAWING MACHINE.

1,345,492. Specification of Letters Patent. Patented July 6, 1920.

Application filed June 30, 1917. Serial No. 177,917.

*To all whom it may concern:*

Be it known that I, ROBIN H. IRVINE, a citizen of the United States of America, residing at Bay City, in the county of Bay and State of Michigan, have invented certain new and useful Improvements in Tree-Sawing Machines, of which the following is a specification.

The invention relates to tree sawing machines and the like, and has for its objects the provision of a machine designed particularly for felling standing timber, and adapted to be readily transported from one tree to another.

Another object resides in the provision of a timber felling machine, wherein the mechanism is such as to actuate the saw after the fashion ordinarily adopted by two operators sawing with the ordinary cross cut saw.

With the above and other objects in view the present invention consists in the combination and arrangement of parts hereinafter more fully described illustrated in the accompanying drawings, and more particularly pointed out in the appended claims, it being understood that changes may be made in the shape, size, materials, proportions and minor details without departing from the spirit of the invention or sacrificing any of the advantages of the invention.

In the drawings:

Figure 1 is a plan view of my invention;

Fig. 2 is a side elevation thereof, partly in section;

Fig. 3 is an enlarged view of the sawing attachment;

Fig. 4 is an enlarged view of the forked guide bar;

Fig. 5 is a side elevation of the saw head;

Fig. 6 is an end elevation thereof;

Fig. 7 is a plan of the saw operating mechanism showing the same in different positions.

Referring now more particularly to the accompanying drawings, the reference character 10 indicates a saw blade which is designed to fell standing timber 11 very close to the ground line. This saw blade 10 has its inner end in a slot 12 in the head block 13, in which the inner end of the saw blade is pivotedly mounted at 14, and on which pivot the saw blade has swinging movement. The head block 13 has a socket 15 therein which registers with the aforesaid slot 12, and in which is disposed a spring 16 designed to bear against the inner end of the saw blade 10, and tending to force the opposite end of the saw blade inwardly against the timber, the spring being held in position by the screw plug 17.

The saw blade 10 is adapted to be reciprocated in a manner hereinafter explained, and in its reciprocation it is guided between the forks 18 and 19 of the forked arm 20, said forks having sliding movement through the member 9 disposed on the saw blade 10 as clearly shown in Fig. 3, the forked arm 20 being secured in a suitable bracket 21 connected to the frame A on which the operating mechanism for the saw is mounted. This forked arm 20 is angular in formation and disposed angularly with relation to the line of reciprocation of the saw blade.

The frame A on which the operating mechanism is mounted, may be of any suitable construction, but as shown the same consists of side sills 22 and 23 connected by the cross pieces 24 and 25. On this frame A is an upper frame B mounted on suitable supports 26, and connecting the side sills of which are cross pieces 27 and 28.

Bearing blocks 29 and 30 are mounted on the cross pieces 24 and 25 respectively, in which are journaled the shafts 31 and 32 respectively, and which extend through the cross pieces 27 and 28 of the upper frame B. The shaft 31 has a collar 33 adapted to operate on balls 34 in a raceway formed in the bearing block 29. The shaft 32 has a shoulder 35 designed to rest on the balls 36 located in a raceway formed in the upper face of the bearing block 30.

A spur gear 37 is keyed to the shaft 31 above the frame B and on this spur gear is a wrist pin 38 to which is connected a link 39 pivotedly connected at 40 to a hand operated lever 41, pivoted at 42 on the frame A, whereby upon reciprocal movement of the lever 41 by the operator, the spur gear 37 and the shaft 31 are caused to rotate. This spur gear 37 meshes with a gear 43 fixed on the hub of a fly wheel 44 loose on said shaft 32 and whose periphery is thickened or weighted as indicated at 45. By reason of the bulk of the weight of the fly wheel being located at the rim, it is obvious that the fly wheel will insure a uniformity of movement when the machine is in operation.

The shaft 32 projects above a frame C in which it is journaled and receives a gear wheel 46 which is loose thereon. This gear 46 is located in a gear casing 47 keyed to the shaft 32. An idler gear 48 the same size as the stationary gear 46 is mounted on a pin 49 journaled in the casing 47, and meshing with the spur gear 46 and also with the gear 50 journaled in the casing 47 on a pin 51, and which has a ratio of approximately two to one with the idler gear, and which has a squared outer end to receive a squared socket of the crank arm 52 connected at 53 to a pitman 54, whose outer end is pivotedly connected at 55 to the saw head block 13, it will thus be apparent that upon rotation of the shaft 32 and the gear casing 47 about the stationary gear 46, the outer end of the crank arm will describe a straight oscillating motion on the line $d$ Fig. 7.

A clutch 56 is slidably mounted on the shaft 32 and has a beveled periphery adapted to clutch with the under cut or beveled under face of the fly wheel 44. Upon operation of the hand lever 41 to rotate the spur gear 37, the gear casing and the sawing mechanism remain stationary, until a considerable speed has been attained by the fly wheel 44, the operator then steps on the treadle lever 58 pivoted at 59, and thus forces the collar 57 and consequently the clutch 56 upward and into clutching relation with the fly wheel 44, the treadle lever being held in this position by the member 58' secured to the frame A. The gear casing 47 is thus given rotative movement, and by virtue of the crank connection 52 with the pitman 54 the saw is reciprocated to operate on the tree 11.

While one operator manipulates the lever 41 another operator grasps the handle 62 connected to the forked arm 20 to force or hold the saw blade 10 in cutting engagement with the tree 11.

From the foregoing, it will be understood that I provide a machine for cutting down or felling trees through the instrumentality of a comparatively light inexpensive, durable and efficient machine which will perform the functions ordinarily ascribed to an ordinary cross cutting saw manipulated from its ends in the hands of two operators.

What I claim is:

1. The combination of a head block having a slot and provided therein with a socket intersected by the slot, a saw pivoted in the slot and movable through a portion of the socket and a coiled spring mounted in the socket and arranged to bear against the saw and urge the same outwardly.

2. The combination of a head block having a slot and provided with a socket intersected at its outer portion by the slot, a saw pivoted within the slot and movable through the inner portion of the socket, a coil spring mounted in the socket and bearing against the saw for urging the same outwardly and means mounted within the outer portion of the socket for adjusting the tension of the spring.

3. The combination of a saw, means for imparting reciprocating movement thereto, a member mounted on the saw and projecting from opposite sides thereof to form studs, and having openings in the latter, and a pivoted forked arm straddling the saw and having its sides extending through the said openings of the studs and operating means connected with the forked arm for feeding the saw.

4. The combination of a saw, means for imparting reciprocating movement thereto, a member mounted on the saw and projecting from opposite sides thereof to form studs, and having openings in the latter, and a pivoted forked arm straddling the saw and having its sides extending through the said openings of the studs, and a handle having a forked portion straddling the saw and connected to the sides of the forked portions of the arm.

5. The combination of a portable frame, spaced front and rear vertical shafts mounted in the frame, a horizontal gear mounted on the rear shaft and having a wrist pin, operating means connected with the said wrist pin, a fly wheel loose on the front shaft and provided at its upper face with a horizontal pinion meshing with the said horizontal gear, said fly wheel being provided with a lower clutch face, a slidable clutch member mounted on the front shaft and located beneath and arranged to engage the clutch face of the fly wheel for connecting the latter to the front shaft, a saw and means located above the said pinion and including an epicyclic train of gears imparting reciprocating movement to the saw.

6. The combination of a saw, means for imparting reciprocating movement to the saw including a head block having a slot and provided with a socket intersected at its outer end by the slot, said saw being pivoted within the slot and movable through a portion of the socket, a coiled spring in the socket and bearing against the tree for urging the same outwardly, a member pivoted at one end beyond the saw and extending longitudinally of the same, and means for slidably connecting the other end of the member with the saw.

7. The combination of a saw, means for imparting reciprocating movement to the saw including a head block having a slot and provided with a socket intersected at its outer end by the slot, said saw being pivoted within the slot and movable through a portion of the socket, a coiled spring in the socket and bearing against the tree for urging the same outwardly, a member pivoted at one end beyond the saw and extending longitudinally of the same, means for slidably connecting the other end of the member with the saw, and an operating member pivoted to the said member beyond the slidable connection of the same with the saw.

In testimony whereof I affix my signature.

ROBIN H. IRVINE.